United States Patent [19]

Eisentraut et al.

[11] 4,044,116
[45] Aug. 23, 1977

[54] METHOD FOR THE COMPLETE DISSOLUTION OF MINERAL SAMPLES

[75] Inventors: Kent J. Eisentraut, Xenia; Shib C. Chattoraj, Fairborn, both of Ohio

[73] Assignee: The United States of America as represented by the Secretary of the Air Force, Washington, D.C.

[21] Appl. No.: 692,720

[22] Filed: June 4, 1976

[51] Int. Cl.$^2$ ............................................... B01F 1/00
[52] U.S. Cl. .................................. 423/658.5; 423/53; 423/132; 23/230 R
[58] Field of Search .................... 423/1, 53, 132, 341, 423/658.5; 75/101 R, 115, 121; 23/230 R

[56] References Cited
PUBLICATIONS

Levinson, Editor, *Proceedings of the Second Lunar Science Conference,* vol. 2, pp. 1451–1459, M.I.T. Press (1971).
Furman, Editor, *Standard Methods of Chemical Analysis,* vol. I, 5th Edition, D. Van Nostrand Co. Inc., New York, (1939), pp. 883, 884.

*Primary Examiner*—O. R. Vertiz
*Assistant Examiner*—Brian E. Hearn
*Attorney, Agent, or Firm*—Joseph E. Rusz; Cedric H. Kuhn

[57] ABSTRACT

A method for the complete dissolution of "hard to dissolve" mineral samples, such as lunar and geological samples, wherein milligram amounts of a sample in particulate form is successively mixed while heating with small amounts of hydrofluoric acid and a mixture of sulfuric acid and distilled, demineralized water. Heating of the resulting solution is continued until its volume is reduced to about 2 milliliters after which the solution is rapidly cooled to room temperature. After adding a small amount of distilled, demineralized water, it is heated while swirling to provide a crystal clear solution. When dissolving lunar or other samples containing beryllium and chromium, an amount of a solution of sodium hydroxide is added to the crystal clear solution that is sufficient to bring the pH of the solution to about 2.5. The method makes it possible to completely dissolve mineral samples rapidly and efficiently for subsequent accurate chemical analysis.

3 Claims, No Drawings

METHOD FOR THE COMPLETE DISSOLUTION OF MINERAL SAMPLES

RIGHTS OF THE GOVERNMENT

The invention described herein may be manufactured and used by or for the Government of the United States for all governmental purposes without the payment of any royalty.

FIELD OF THE INVENTION

This invention relates to a method for completely dissolving "hard to dissolve" mineral samples, particularly lunar and geological samples. In one aspect the invention relates to the analytical determination of the elements of mineral samples.

BACKGROUND OF THE INVENTION

It has been observed that 48 percent ACS reagent grade hydrofluoric acid reacts very vigorously with lunar or geological samples. Standard textbooks recommend the use of 0.5 to 0.8 gram of samples for treatment with hydrofluoric acid. [Textbook of Quantitative Inorganic Analysis, I. M. Kolthoff and E. B. Sandell, 3d Ed., Macmillan Co., New York (1952), page 711; Elements of Quantitative Analysis, Theory and Practice, H. H. Willard, N. H. Furman and C. E. Bricker, 4th Ed., D. Van Nostrand Co., Inc., New York (1956), page 397]. It has also been observed that with the recommended relatively large amount of sample the reaction with hydrofluoric acid is so vigorous as to cause loss of sample due to bumping and spattering. Standard textbooks (ibid, Kolthoff et al, page 711; Willard et al, page 298) recommend the sequential addition of water, sulfuric acid and hydrofluoric acid for the dissolution of mineral samples. It has been found, however, that the recommended order of addition materially diminishes the vigor or reactivity of hydrofluoric acid so that long periods of time, e.g., six or more hours, are necessary to completely dissolve a sample.

If accurate results are to be obtained in quantitative analyses, it is imperative that the samples to be analyzed be completely dissolved. If the solution contains undissolved or precipitated sample, the analytic results will be inaccurate. The results will also be inaccurate if sample is lost during the dissolution procedure. It is also important to complete the dissolution in as short a time as possible.

It is an object of this invention, therefore, to provide a method for completely dissolving "hard to dissolve" samples rapidly and efficiently for subsequent analytical determinations.

Another object of the invention is to provide a method for the complete dissolution of lunar and geological samples for subsequent accurate chemical analysis.

Other objects and advantages of the invention will become apparent to those skilled in the art upon consideration of the accompanying disclosure.

SUMMARY OF THE INVENTION

The present invention resides in the discovery that mineral samples can be completely dissolved by contacting a milligram sample successively with hydrofluoric acid and a mixture of sulfuric acid and distilled, demineralized water. It is critical that milligram amounts of sample, i.e., an amount not exceeding 80 milligrams, be used and that the sample be contacted with critical amounts of the reagents in the aforementioned order. By utilizing much smaller amounts of sample than are recommended by the prior art, the samples can be initially mixed with hydrofluoric acid with no danger of sample loss because of bumping and spattering. In the subsequent step of the present method in which sulfuric acid and water are added, complete dissolution of the sample is accomplished in a very short time. Thus, by the present method a sample is completely dissolved in about 1 to 30 minutes whereas by conventional methods 6 hours or more are required. The procedure described herein solves the problem of being able to completely dissolve lunar and other samples and represents an unexpected improvement over current methods.

As used herein, the term "mineral samples" is used generically to designate inorganic substances naturally occurring in the earth, i.e., geological samples, as well as substances occurring in the moon, i.e., lunar samples. Furthermore, the term is intended to cover other inorganic substances, such as aerospace materials, particulate rocket exhaust, air or ground pollution samples and other "hard to dissolve" samples whose components it is desired to determine quantitatively by chemical analysis. The present method is particularly applicable to the complete dissolution of lunar samples since only small quantities of lunar material are available for analysis.

In carrying out the method of this invention, the amount of sample used does not exceed 80 milligrams, e.g., about 50 to 80 milligrams. In a preferred procedure, the sample is ground or crushed into submicron size particles so as to form a powder.

Initially, the sample is mixed with hydrofluoric acid by adding the acid dropwise to a Teflon beaker containing the sample. Mixing of the sample and acid is conveniently accomplished by swirling the beaker. While the total amount of hydrofluoric acid added ranges from about 1.65 to 4.30 milliliters, the acid is added in increments. Thus, about 0.15 to 0.30 milliter of acid is added to the sample which is spread out over the bottom of the beaker. Thereafter, about 0.60 to 1.20 milliliters of acid is added dropwise, and the beaker is tilted so that the acid contacts a major portion of the sample. Finally, the remainder of the hydrofluoric acid, i.e., about 0.95 to 2.80 milliliters, is introduced dropwise into the beaker. It is within the purview of the invention to combine the last two addition steps and add dropwise about 1.5 to 4.0 milliliters to the beaker. After all of the hydrofluoric acid has been added, the beaker is swirled or rotated to ensure contact between the acid and the entire sample. The beaker and its contents are then heated to a temperature ranging from about 95° to 100° C and swirled until essentially complete dissolution is observed. A period of about 2 to 5 minutes is generally sufficient to obtain this result.

Upon completion of the above-described steps, the beaker and its contents are heated to a temperature in the range of 210 to 215° C. A mixture containing equal volumes of sulfuric acid and distilled, demineralized water is then added dropwise to the beaker in an amount ranging from about 1.5 to 4.0 mililiters. The beaker and its contents are maintained at a temperature in the aforementioned range until the volume of the contents is reduced to about 2 milliliters and copious white fumes of $SO_3$ are observed. The beaker and its contents are then cooled, e.g., by immersing the beaker in cold water. When the beaker and its contents have cooled to about room temperature, approximately 6 to 10 milliliters of distilled, demineralized water is added. Heating of the beaker and its contents is then resumed at a temperature in the range of 95° to 215° C. The heated beaker is swirled continuously until its contents are in the form of a crystal clear solution. A period of about 1 to 2 minutes is generally sufficient to obtain such a solution. The total time required for the complete dissolution of a sample is usually less than 30 minutes.

In the determination of beryllium and chromium in lunar samples, and in other instances if desired, the crystal clear solution is usually further treated by adding dropwise a solution of 12N sodium hydroxide. Addition is continued until the pH of the solution is brought to about 2.5 The function of the sodium hydroxide solution is to neutralize excess acid that may be present in the solution. If a precipitate appears at this point, 1N sulfuric acid is added until the solution becomes crystal clear. The solution is then cooled to room temperature and quantitatively transferred to a clean, dry volumetric flask. The beaker is repeatedly washed with small quantities of distilled, demineralized water, and the washings are added to the volumetric flask. If necessary, additional distilled, demineralized water is added to the flask so as to give a desired liquid volume. Upon shaking the flask, a crystal clear solution of the lunar sample is obtained.

A more complete understanding of the invention can be obtained by referring to the following illustrative example which is not intended, however, to be unduly limitative of the invention.

EXAMPLE I

A run was carried out in which a lunar sample was completely dissolved in accordance with the method of this invention. In carrying out the run, 63.68 mg of NASA Apollo 16 lunar fines sample number 60016,65 was weighed on a Cahn Electrobalance. The sample in powder form was quantitatively transferred to a clean, dry 50 ml Teflon beaker. The sample was spread out over the bottom of the beaker by gently tapping its base.

One drop (about 0.023 ml) of 48% ACS reagent grade hydrofluoric acid was carefully added to the sample from a polyethylene dropper. It is noted that the entire dissolution procedure was conducted in a laboratory fume hood. Four additional drops of the acid were then added to the sample. The beaker was carefully tilted so that the hydrofluoric acid contacted the major portion of the sample. Reaction of the sample with the acid was observed with the evolution of a white vapor. Thereafter, 55 drops of hydrofluoric acid was added to the sample. A total of about 1.4 ml of hydrofluoric acid was added in the manner described. The solution was gently swirled to ensure contact of the acid with the entire sample.

The beaker and its contents were next placed on a hot plate (Thermolyne Model No. (SP-A1025B) which had been preheated at setting 3 (measured silicone oil temperature at this setting is about 98° C). Using tongs the beaker was gently swirled throughout the remainder of the dissolution procedure. The sample was observed until essentially complete dissolution was noticed which was less than 5 minutes. The solution volume at this point should not be reduced below about 0.5 ml.

The temperature setting of the hot plate was increased to setting 6 (measured silicone oil temperature at this setting was about 214° C). A quantity of 60 drops (about 2.6 ml) of 1:1 Ultrex sulfuric acid and distilled, demineralized water was added dropwise to the solution. The solution was heated at setting 6 until the volume of the solution was reduced to about 2 ml. During this volume reduction, the evolution of copious white fumes was observed. The beaker containing the solution was removed from the hot plate and cooled by immersing the bottom one-third of the beaker in a vessel containing cold water. When the solution was cooled to about room temperature, about 8 ml of distilled, demineralized water was carefully added. The beaker was then placed on the hot plate ate setting 3 to 6 and continuously swirled for about 1.5 minutes until a crystal clear solution was obtained.

The above procedure resulted in a crystal clear solution with the lunar sample matrix being completely dissolved. The total time for the procedure was less than 30 minutes.

The solution was further treated to neutralize excess acid by adding dropwise a solution of 12N reagent grade sodium hydroxide until the pH of the solution was brought to about 2.5. The solution was then cooled to room temperature and quantitatively transferred to a clean, dry 25 ml volumetric flask. The beaker was repeatedly washed with small quantities of distilled, demineralized water, and the washings were added to the volumetric flask. The solution was brought to the mark with additional distilled, demineralized water. The flask was shaken, and a clear crystal solution of the lunar sample resulted.

EXAMPLE II

Electron Capture Gas Chromatographic Analysis for Beryllium

The lunar sample, herein identified as sample A, which was dissolved as described in Example I, was analyzed for beryllium by electron capture gas chromatography. The details of the procedure followed are described below.

Five (5) separate aliquots of 4 ml each of the dissolved lunar solution were removed by volumetric pipet from the 25 ml volumetric flask and transferred to individual 30 ml polyethylene bottles fitted with polyethylene screw caps. To each of the five (5) aliquots was added a quantity of 4 ml of an EDTA/buffer solution using an automatic repipet apparatus. (The EDTA/buffer solution was prepared by mixing together 12.68 grams disodiumtrihydrogenethylenediaminetetraacetate dihydrate, 85 grams sodium acetate trihydrate, and 6.25 ml glacial acetic acid, and diluting the resulting solution to 500 ml using distilled-demineralized water.) The caps were tightened and the polyethylene sample bottles were shaken for five minutes on an automatic Burrell Wrist Action Shaker. The sample bottles were then placed in a water bath at 95°–98° C for five minutes after which they were removed and allowed to cool to room temperature. To each of the cooled samples was then pipeted 10 ml of a 0.082 N solution of trifluoroacetylacetone, H(tfa), in Nanograde benzene. (The H(tfa) was freshly distilled prior to preparing the 0.082 N stock solution.) The caps were tightened and the sample solutions were shaken for fifteen minutes on the automatic shaker. After completion of shaking, the solutions were transferred to individual silanized 60 ml separatory funnels. The aqueous layer was drained off and discarded. A quantity of 15 ml of 0.1 N sodium hydroxide solution was added to the sample polyethylene bottles, shaken and then poured into each of the separatory funnels containing the sample. The polyethylene stopper was then placed into each separatory funnel which were then vigorously shaken for 5 seconds (Warning: allowing the NaOH solution to remain in contact for longer than the prescribed 5 seconds can result in inaccurate beryllium analysis). The aqueous NaOH layer was rapidly removed from each separatory funnel containing the benzene layer. One microliter of the benzene solution containing the beryllium trifluoroacetylacetonate chelate was injected into the injection port of the gas chromatograph and by comparison of its peak height or area with that of beryllium trifluoroacetylacetonate standards, its concentration in the original lunar sample was obtained. Each of the five aliquots taken was treated in an identical manner, with each aliquot being injected into the chromatograph five times.

The electron capture gas chromatographic conditions used for the analysis were as follows:

Injection Port Temp = 160° C.
Column Temp = 100° C.
Tritium Electron Capture Detector Temp = 180° C.
Carrier Gas = 10% Methane in Argon; Flow Rate = 100 ml/min.
Column = 10% SE-30 on 80/100 mesh hand-sieved Gas-Chrom Z; 24 inches long × ⅛ inch i.d.
Detection Limit = $4 \times 10^{-14}$ gram beryllium.

Two additional samples, herein identified as samples B and C, which were taken from different parts of lunar fines sample number 60016,65, were dissolved according to the procedure described in Example I. The samples were thereafter analyzed for beryllium by electron capture gas chromatography following the procedure described hereinabove.

The analytical results obtained on the three samples of the lunar samples are shown in the following table:

TABLE

| SAMPLE | Be Concentration, ppm |
|---|---|
| A | 1.11 ± 0.01 |
| B | 0.90 ± 0.02 |
| C | 1.21 ± 0.04 |

As seen from the foregoing, the present method makes it possible to dissolve rapidly and efficiently a "hard to dissolve" mineral sample, such as a lunar sample. The dissolution is complete, thereby making it possible to obtain accurate analytical determinations.

As will be evident to those skilled in the art, modifications of the present invention can be made in view of the foregoing disclosure without departing from the spirit and scope of the invention.

We claim:

1. A method of the complete dissolution of milligram amounts of a sample of minerals which comprises the steps of:
   1. adding dropwise about 0.15 to 0.30 ml of hydrofluoric acid to a flat-bottomed beaker containing about 50 to 80 milligrams of the sample in finely divided form spread out over the bottom of the beaker;
   2. tilting the beaker so that a major portion of the sample is contacted with the hydrofluoric acid;
   3. adding dropwise to the beaker an additional amount of hydrofluoric acid ranging from about 1.5 to 4.0 ml;
   4. swirling the beaker so as to ensure contact between the acid and the entire sample;
   5. heating the contents of the beaker to a temperature ranging from about 95° to 100° C;
   6. swirling the beaker for a period of about 2 to 5 minutes;
   7. heating the contents of the beaker to a temperature ranging from about 210° to 215° C;
   8. adding dropwise to the beaker about 1.5 to 4.0 ml of a mixture of equal volumes of sulfuric acid and distilled, demineralized water;
   9. continuing to heat the contents of the beaker at a temperature ranging from about 210° to 215° C until the volume of the contents is reduced to about 2 ml;
   10. rapidly cooling the contents of the beaker to about room temperature;
   11. adding about 6 to 10 ml of distilled, demineralized water to the beaker;
   12. heating the contents of the beaker to a temperature ranging from about 95° to 215° C; and
   13. swirling the beaker until its contents are in the form of a crystal clear solution.

2. The method according to claim 1 in which a solution of 12N sodium hydroxide is added dropwise to the crystal clear solution until the pH of the solution is about 2.5; the solution is cooled to room temperature and transferred to a volumetric flask; the beaker is washed with distilled, demineralized water; and the washings are added to the volumetric flask.

3. The method according to claim 2 in which the sample is a lunar sample.

* * * * *